US012196030B2

(12) United States Patent
Razzaboni et al.

(10) Patent No.: US 12,196,030 B2
(45) Date of Patent: Jan. 14, 2025

(54) SYSTEM FOR THE SAFE COUPLING OF A RE-USABLE BAG TO A BANKNOTE HANDLING AND STORING MACHINE AND RELEVANT USE METHOD

(71) Applicant: CIMA S.P.A., Mirandola (IT)

(72) Inventors: Nicoletta Razzaboni, Mirandola (IT); Vittorio Razzaboni, Mirandola (IT)

(73) Assignee: CIMA S.P.A., Mirandola (IT)

( * ) Notice: Subject to any disclaimer, the term of this patent is extended or adjusted under 35 U.S.C. 154(b) by 387 days.

(21) Appl. No.: 17/638,110

(22) PCT Filed: Sep. 4, 2020

(86) PCT No.: PCT/IB2020/058234
§ 371 (c)(1),
(2) Date: Feb. 24, 2022

(87) PCT Pub. No.: WO2021/044352
PCT Pub. Date: Mar. 11, 2021

(65) Prior Publication Data

US 2022/0186546 A1 Jun. 16, 2022

(30) Foreign Application Priority Data

Sep. 5, 2019 (IT) ........................ 102019000015638

(51) Int. Cl.
*E05G 7/00* (2006.01)
*B65B 67/12* (2006.01)
*G07D 11/125* (2019.01)

(52) U.S. Cl.
CPC .............. *E05G 7/001* (2013.01); *B65B 67/12* (2013.01); *G07D 11/125* (2019.01)

(58) Field of Classification Search
CPC ...... G07D 11/00; G07D 11/10; G07D 11/125; G07D 11/0093; G07D 11/0096;
(Continued)

(56) References Cited

U.S. PATENT DOCUMENTS 3,292,849 A * 12/1966 Ewing ...................... E05G 1/005
232/15
3,795,417 A * 3/1974 Cohen ....................... G07F 9/06
292/144
(Continued)

FOREIGN PATENT DOCUMENTS

CN 207731380 U * 8/2018
CN 111927245 A * 11/2020 ............. E05B 15/00
(Continued)

OTHER PUBLICATIONS

International Search Report issued Nov. 27, 2020 re: Application No. PCT/IB2020/058234, pp. 1-4.
(Continued)

*Primary Examiner* — William L Miller
(74) *Attorney, Agent, or Firm* — CANTOR COLBURN LLP

(57) ABSTRACT

A system for the safe coupling of a re-usable bag to a banknote handling and storing machine, the system includes a bag container, having an upper rigid mouth, of a flexible bag permanently fixed to the rigid mouth and of a lid for closing the rigid mouth. The system also includes a bag-holding frame, suitable for being stably fixed to a safe structure of the machine, for supporting and hooking the bag container when placed inside the machine to be filled in with the banknotes, is provided with coupling and hooking electromechanical components between the bag container and the bag-holding frame. The lid for closing the rigid mouth is further provided with an element suitable to allow, on command, the banknotes passing from the machine to the bag through the closed lid when the bag container is correctly inserted inside the machine.

21 Claims, 5 Drawing Sheets

(58) Field of Classification Search
CPC ...... G07D 11/14; G07D 11/225; G07D 11/12; G07F 19/00; G07F 19/205; G07F 19/202; B65B 5/106; B65B 67/12; E05G 1/06; E05G 1/10; E05G 1/005; E05G 1/04; E05G 7/001
See application file for complete search history.

(56) References Cited

U.S. PATENT DOCUMENTS

| | | | | |
|---|---|---|---|---|
| 4,529,118 | A * | 7/1985 | Granzow | G07D 11/125 109/43 |
| 5,715,923 | A * | 2/1998 | Dekker | G07F 7/04 232/15 |
| 5,850,966 | A * | 12/1998 | Siler | G07D 11/125 109/46 |
| 5,873,446 | A * | 2/1999 | Wei | G07F 9/06 232/16 |
| 6,042,001 | A * | 3/2000 | Siler | G07F 9/06 109/46 |
| 8,584,603 | B2 * | 11/2013 | Villiger | G07D 11/12 232/15 |
| 9,483,893 | B2 * | 11/2016 | Bullock | G07D 11/125 |
| 11,486,186 | B2 * | 11/2022 | Razzaboni | G07D 11/0096 |
| 2001/0054643 | A1 * | 12/2001 | Siemens | G07D 11/12 235/379 |
| 2005/0077347 | A1 | 4/2005 | Uematsu et al. | |
| 2007/0145064 | A1 * | 6/2007 | Clauser | G07D 11/12 220/212.5 |
| 2011/0186622 | A1 * | 8/2011 | Nikon | G07F 9/06 232/15 |
| 2014/0165887 | A1 * | 6/2014 | Bane | E05G 1/04 109/64 |
| 2019/0233147 | A1 * | 8/2019 | Okuda | B65B 51/146 |
| 2019/0330005 | A1 * | 10/2019 | Yokoo | B65B 25/14 |
| 2020/0332587 | A1 * | 10/2020 | Razzaboni | E05G 1/04 |

FOREIGN PATENT DOCUMENTS

| | | | | |
|---|---|---|---|---|
| CN | 214825695 | U * | 11/2021 | |
| CN | 114519909 | A * | 5/2022 | |
| CN | 114604518 | A * | 6/2022 | B65D 33/00 |
| CN | 115565287 | A * | 1/2023 | |
| CN | 116152985 | A * | 5/2023 | |
| CN | 110570606 | B * | 1/2024 | E05B 17/186 |
| EP | 2385505 | A1 | 11/2011 | |
| EP | 3486880 | A1 | 5/2019 | |
| EP | 3624074 | A1 * | 3/2020 | G07D 11/18 |
| EP | 3726487 | A1 * | 10/2020 | E05G 1/005 |
| GB | 2218150 | A | 11/1989 | |
| IT | TO20090154 | A1 | 9/2010 | |
| WO | 0219289 | A2 | 3/2002 | |
| WO | 2008151773 | A1 | 12/2008 | |
| WO | WO-2021044352 | A1 * | 3/2021 | B65B 67/12 |

OTHER PUBLICATIONS

Written Opinion issued Nov. 27, 2020 re: Application No. PCT/IB2020/058234, pp. 1-9.

* cited by examiner

SYSTEM FOR THE SAFE COUPLING OF A RE-USABLE BAG TO A BANKNOTE HANDLING AND STORING MACHINE AND RELEVANT USE METHOD

TECHNICAL FIELD

The present disclosure relates to a system for the safe coupling of a re-usable bag, intended to be filled with banknotes or other paper valuables, to a banknote handling and storing machine.

The disclosure also refers to a method for coupling and removing such bag from the machine.

BACKGROUND

Banknote handling and storing machines are normally provided with a safe wherein banknotes (at least those possibly not intended to be directly dispensed by the machine itself, in case the machine provides for this functionality) are accumulated until they are removed and taken to specific valuable deposit storage rooms, or used for filling other cash dispensers.

Rigid containers (boxes) or flexible bag containers can be used to accumulate banknotes inside the safe. Bag containers can in turn be of the single-use type, which are sealed (or in any case irreversibly closed) once filled, before being removed from the machine, or of the re-usable type. These latter are provided with a reversible closure, typically a lid which must be applied to the mouth of the bag to enable unhooking the bag from the safe frame.

The systems known in the art for coupling re-usable bags to the machine basically comprise three components:

- a bag-holding frame, fixed to the safe of the banknote handling and storing machine, which is for supporting and keeping the bag hooked;
- the bag container, composed of a rigid mouth (or frame), which the flexible bag is permanently fixed to;
- a lid (normally consisting of a rigid element), intended to close the mouth of the bag container at the end of the filling operations, which also has the function to enable (once hooked to the rigid mouth) unlocking the bag container from the safe.

Both hooking the bag to the bag-holding frame, and hooking the lid to the rigid mouth of the bag container are usually carried out by means of merely mechanical couplings. Electrical sensors and/or connections may sometimes be provided in order to allow for detection of the presence and correct positioning of the various components.

It is obvious that this can imply serious security problems both regarding the likelihood to improperly remove the bag container from the safe, and regarding the likelihood to tamper with the lid after extracting the bag container from the safe.

In particular, in order to limit at least partially the likelihood of tampering after removing the container from the machine, a security seal is normally applied to the bag, by an operator, after inserting the lid on the rigid mouth.

Typically, such security seal consists of a plastic tie inserted into respective eyelets present on the edge of the lid and of the rigid mouth of the bag container. However, no guarantee shall be provided against possible fraudulent actions directed to the container, for instance by breaking the tie and then replacing it with a new one after tampering with the bag content, or even more simply leaving the seal closed, though not completely tightened, such that it is possible to have partial access to the bag and, then, definitively tightening the tie.

In order to further increase security, it was also suggested to associate each bag container with a single closing lid, for instance providing bag containers and lids with respective identification codes, and possibly specific radio-frequency identification devices (RFID tags), such to enable the machine control unit to verify the authenticity of the lid inserted and correctness in the coupling with the respective bag container.

However, even adopting such measures, no complete security can be ensured against possible tampering of the container after its removal from the machine.

SUMMARY

The disclosure overcomes the above-mentioned drawbacks by providing a system for the safe coupling of a re-usable bag to a banknote handling and storing machine, which allows for an increase in the security level both in relation to authorising the removal of the bag from the machine, and in relation to possible tampering with the bag during the following transport steps.

The disclosure further ensures that the bag can be removed from the machine only if the mouth through which banknotes are introduced is closed correctly.

Considering such advantages, it was envisaged, according to the disclosure, a system for the safe coupling of a re-usable bag to a banknote handling and storing machine is provided, the system comprising:

- a bag container, comprised of an upper rigid mouth, of a flexible bag permanently fixed to said rigid mouth and of a lid for closing said rigid mouth;
- a bag-holding frame, suitable for being stably fixed to a safe structure of the machine, for supporting and hooking the bag container when placed inside the machine to be filled with the banknotes;

characterized in that it comprises coupling and hooking electromechanical means between the bag container and the bag-holding frame, said coupling and hooking electromechanical means comprising an electro-actuated lock provided on the bag-holding frame and a blocking element provided on the bag container in correspondence of said electro-actuated lock to engage and block into the same when the bag container is correctly coupled to the bag-holding frame, with a micro-switch associated with said electro-actuated lock to detect the presence and the correct insertion and blocking of the bag container in the bag-holding frame and to send to a control unit a signal of presence and correct blocking of the bag container on the bag-holding frame, said coupling and hooking electromechanical means further comprising a first electric connector provided on the bag-holding frame and a second electric connector provided on the bag container in correspondence of said first electric connector to realize the electrical connection between the bag container, the bag-holding frame and the control unit when the bag container is positioned on the bag-holding frame, and further characterized in that the lid for closing said rigid mouth is provided with means suitable to allow, on command, the banknotes passing from the machine to the bag through the closed lid when the bag container is correctly inserted inside the machine.

According to the disclosure, a method was further realized for coupling and removal of a bag container from a banknote handling and storing machine, comprising, for the insertion of the bag container into the machine, the steps of:

closing the lid on the upper rigid mouth supporting the bag;

applying a security seal for the lid, inserting the same into a seat passing through a first portion belonging to the lid, through a second portion belonging to the upper rigid mouth and through a movable hook for locking and unlocking the lid, sliding transversely between said first and second portions;

introducing the bag container inside the machine, inserting its upper rigid mouth into guides of the bag-holding frame until engagement of the blocking element in the electro-actuated lock provided on the bag-holding frame, thus realizing an electric connection between the electric connectors respectively provided on the bag-holding frame and on the bag container and sending to the control unit a signal of presence and correct blocking of the bag container on the bag-holding frame;

following the receipt of said signal of presence and correct blocking of the bag container on the bag-holding frame, the control unit enabling the controlled opening and closing of the movable element provided in correspondence of the passage for the banknotes from the machine to the bag;

and for removing the bag container from the machine the steps of:

verifying, by the control unit, that said movable element is in the closed position and, if this condition is verified, sending an opening control from the control unit to the electro-actuated lock, for the disengagement of the blocking element and the release of the bag container from the bag-holding frame;

extracting the bag container from the machine.

BRIEF DESCRIPTION OF THE DRAWINGS

To clarify the explanation of the innovative principles of the present disclosure and the advantages thereof with respect to the prior art, one possible illustrative embodiment applying such principles will be described below, with the aid of the attached drawings.

In the drawings.

DETAILED DESCRIPTION OF THE DRAWINGS

Figure 1:
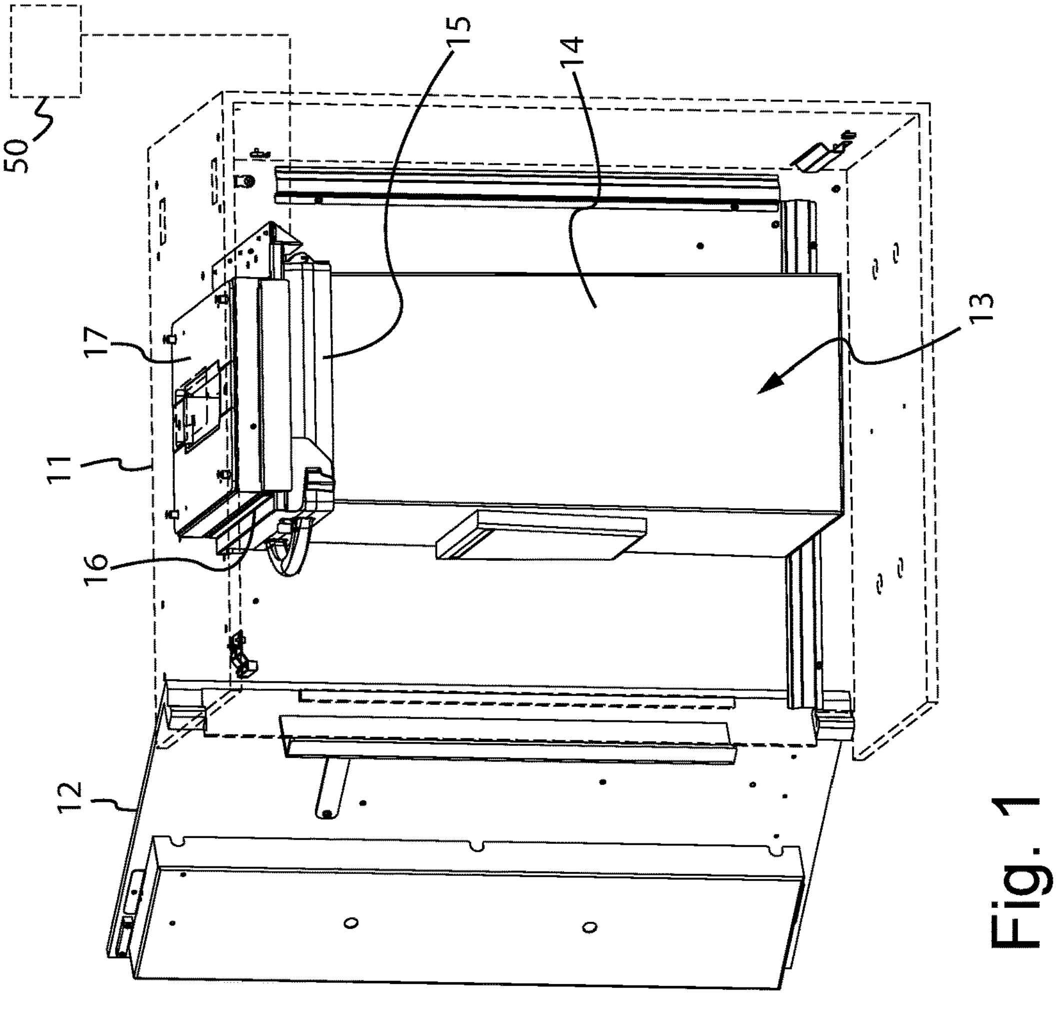
FIG. 1 represents a general view of a part (specifically the safe) of a banknote handling and storing machine, with a bag container according to the disclosure inserted therein.
Figure 2:
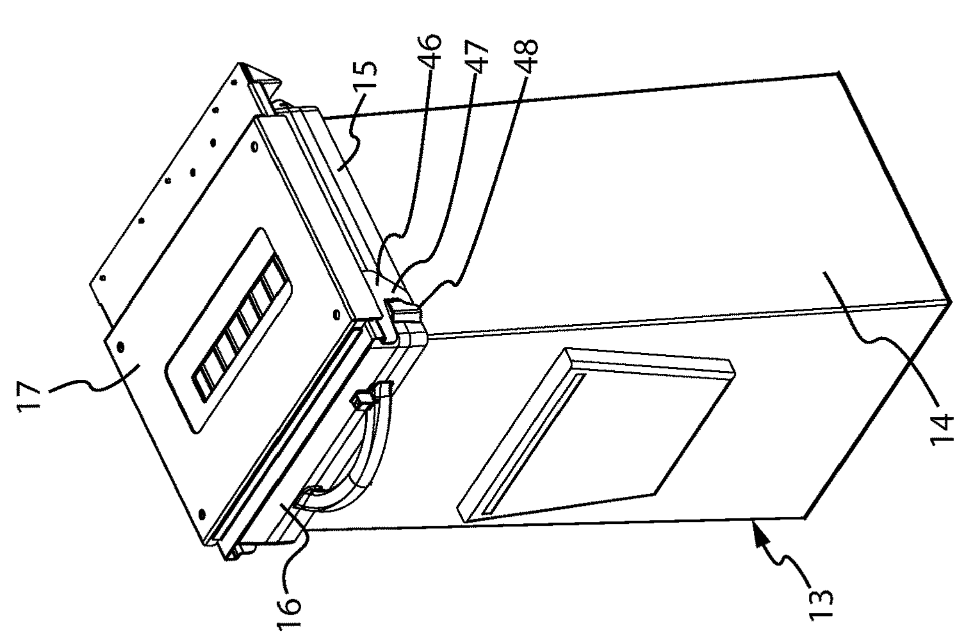
FIG. 2 shows the bag container fixed in place to the bag-holding frame, with the remaining machine not illustrated for greater graphic clarity.

Referring to the figures, in FIG. 1 it is shown a portion of the banknote handling and storing machine, more specifically the safe 11 (represented "in transparency" to make the inside visible) with its door 12 openable, by known lock means, to have access inside the safe and, in particular, for inserting and extracting the bag container 13.

The remaining parts of the machine are not represented herein, as it can be any type of machine for handing and storing banknotes normally present in various trade areas, banks, etcetera, e.g. machines able to receive and dispense banknotes or other paper valuables, or machines only suitable to receive and store banknotes.

The bag container 13 inside the machine basically comprises three main components, i.e. a flexible bag 14, suitable to be filled with banknotes coming from handling and conveying devices inside the machine, a generally rectangular-shaped upper rigid mouth 15, serving as a frame for permanently fixing and supporting the bag 14, and a lid 16 suitable to close the bag container 13, as will be hereinafter explained in greater detail.

In particular, the lid 16 is hinged to the rigid mouth 15 of the bag container 13, such as to rotate between an opened position (shown in FIG. 4), of total access to the inside of the bag container 13 by an operator, and a closed position (shown in FIG. 5), suitable to close said rigid mouth 15 and, consequently, the bag 14 however enabling, during the filling operation inside the machine, the only passage of banknotes entering the bag 14, as will be hereinafter explained in greater detail. The bag container 13 is of the re-usable type, i.e. a bag that can be closed and re-opened, so that it can be used more than once, repeating the cycle of inserting, in an empty condition, into the safe, filling with banknotes by the machine, removing from the machine and transferring towards a place for storing or reusing banknotes.

The bag 14 is made of flexible material, for instance "canvas", so as to be light, while also sufficiently strong, and foldable to minimize its size when it is not used.

In FIG. 1, a bag-holding frame 17 is also visible, stably fixed to the structure of the safe 11, which is for supporting and keeping the bag container 13 hooked when placed inside the banknote handling and storing machine. Advantageously, the bag-holding frame 17 has a perimeter conformation substantially corresponding to that of the rigid mouth 15 and of the lid 16 of the bag container 13, so as to optimise the support of the container as much as possible.

Figures 3, 4, 5:
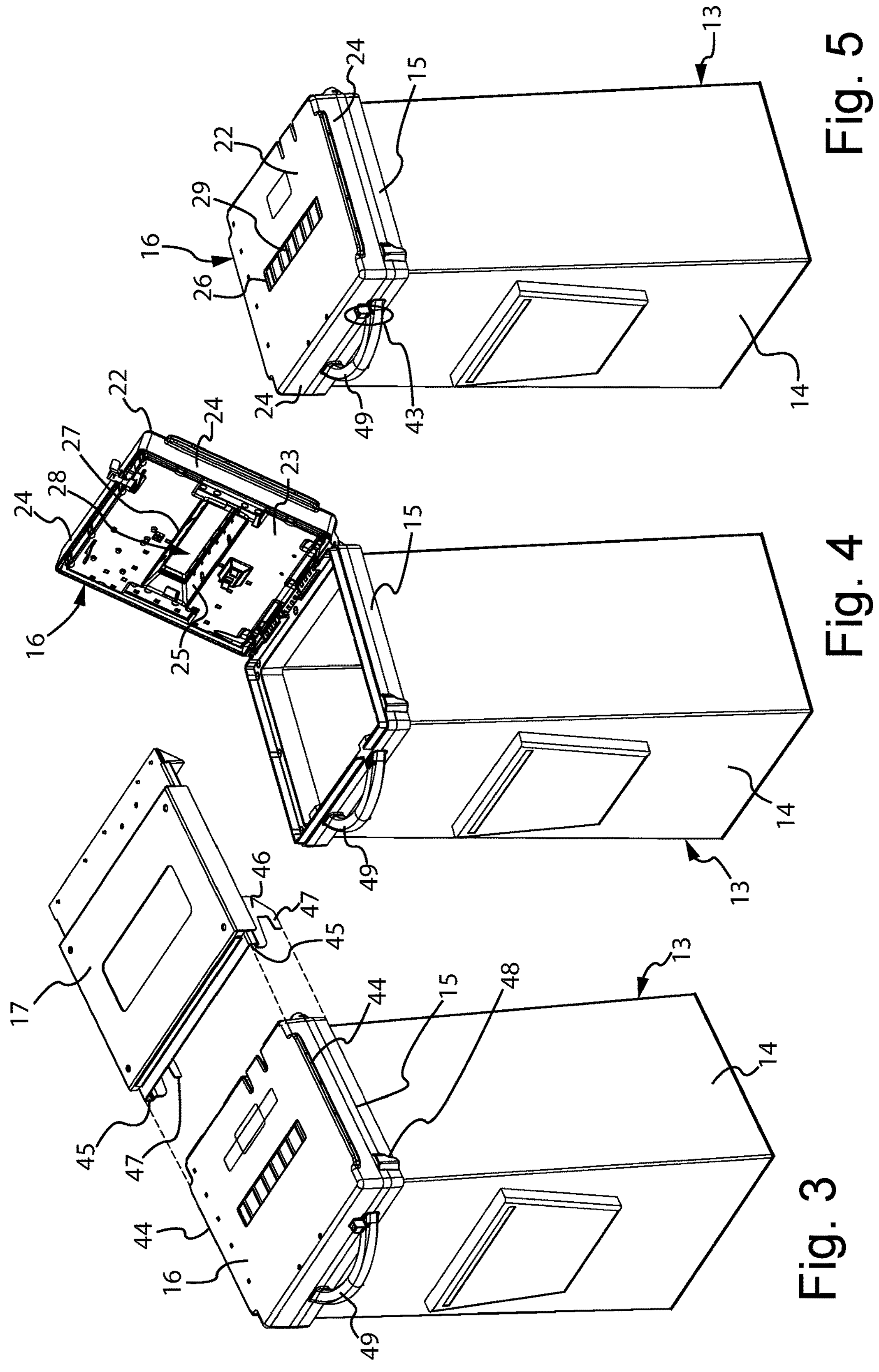
FIG. 3 represents an exploded view of the two main components of the system for coupling the bag to the machine according to the disclosure.
FIG. 4 represents a view of the bag container with the lid in an open position for complete accessibility into the bag.
FIG. 5 represents a view similar to that of FIG. 4 but with the lid in a closed position.

The system for coupling the bag container 13 to the machine according to the disclosure thus basically comprises two components, well visible in a mutually separated condition in FIG. 3:

the bag container 13, comprised of the upper rigid mouth 15, of the flexible bag 14 permanently fixed to the aforesaid rigid mouth and of the lid 16 hinged to the rigid mouth 15;

the bag-holding frame 17, suitable for being stably fixed to the safe structure of the machine, which is for supporting and keeping the bag container 13 hooked when placed inside the machine to be filled with banknotes.

The system for coupling the bag container 13 to the machine according to the disclosure further provides coupling and hooking electromechanical means between the bag container 13 and the bag-holding frame 17.

Figure 7:
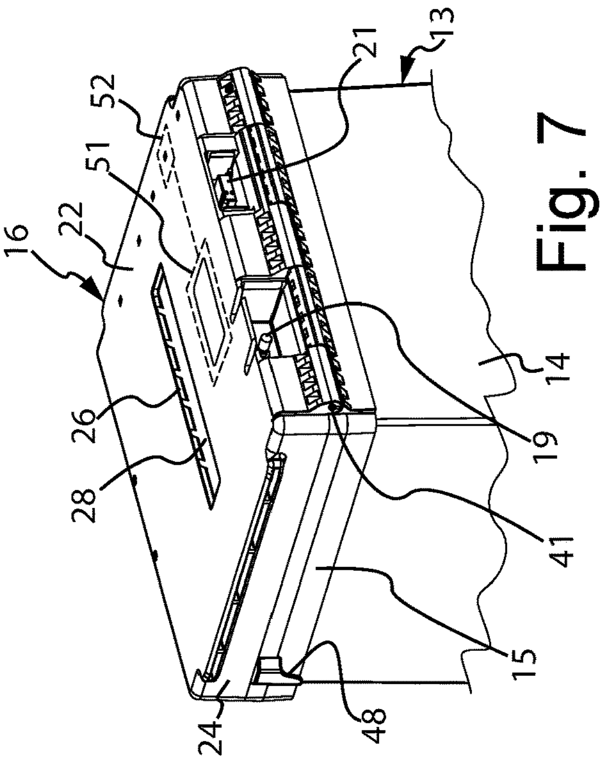
FIG. 7 shows, at the rear, the upper portion of the bag container, with the rigid mouth intended to be fixed on the bag-holding frame and the lid in a closed position.
Figure 6:
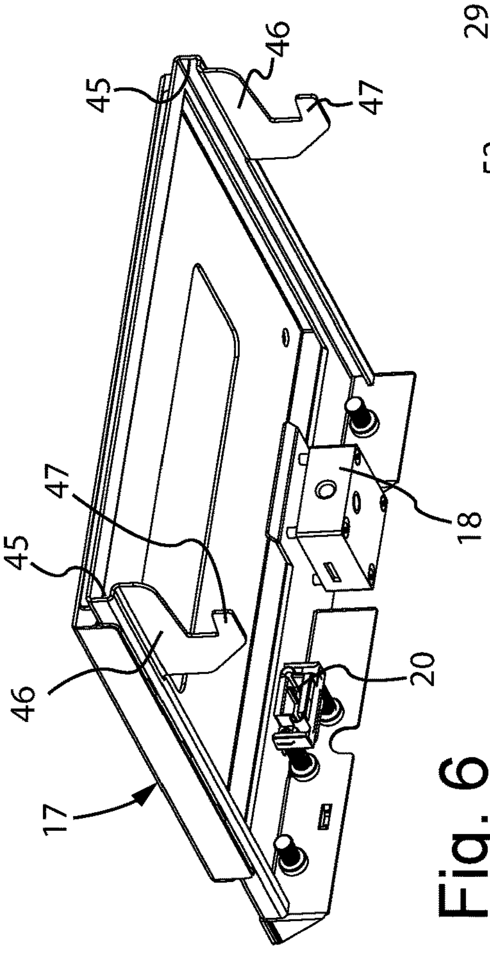
FIG. 6 shows a view from below of the bag-holding frame.

In particular, referring to FIGS. 6-7, said coupling and hooking electromechanical means between the bag container 13 and the bag-holding frame 17 comprise an electro-actuated lock 18 advantageously arranged on the rear portion of the bag-holding frame 17 and facing towards the front part thereof.

The terms "front" and "rear" herein mean respectively a part (of the bag, of the lid or of the bag-holding frame) closer to the access opening from outside into the safe (at the door 12 visible in FIG. 1) and a part more distant from said opening.

Said coupling and hooking electromechanical means between the bag container 13 and the bag-holding frame 17 further comprise a blocking element 19 (advantageously in the form of cylindrical pin) arranged on the rear portion of the bag container 13 and projecting rearwardly therefrom in correspondence of said electro-actuated lock 18 to engage and block therein when the bag container 13 is correctly coupled to the bag-holding frame 17 inside the safe 11 in the position illustrated in FIG. 1.

Of course, the blocking element 19 may also be made in a shape other than a cylindrical pin, depending on the type and configuration of the lock 18 used in the specific case.

A micro-switch (not visible in the enclosed drawings) is advantageously associated with said electro-actuated lock 18, for example housed inside its structure, which detects the presence and the correct insertion and blocking of the bag container 13 in the bag-holding frame 17 and sends to a control unit 50 (schematically represented in FIG. 1) a signal of presence and correct blocking of the bag container 13 on the bag-holding frame 17 ("bag inserted" signal).

Said coupling and hooking electro-mechanical means between the bag container 13 and the bag-holding frame 17 further comprise a first electric connector 20 advantageously arranged on the rear portion of the bag-holding frame 17, facing towards the front part thereof, and a second electric connector 21 arranged on the rear portion of the bag container 13 in correspondence of said first electric connector 20 to realize an electrical connection between the bag container 13, the bag-holding frame 17 and the control unit 50 when the bag container 13 is positioned on the bag-holding frame 17. The pin 19 and the electric connection 21 are advantageously arranged on the rear portion of the lid 16, above the hinging axis of the lid 16 to the upper rigid mouth 15, so as to ensure that coupling and hooking of the bag container 13 to the bag-holding frame 17 only occurs if the lid 16 is correctly arranged in the closing position of the bag 14.

According to the disclosure, the closing lid 16 of the bag container 13 is provided with means adapted to allow, on command, the banknotes passing from the machine to the bag 14 through the lid itself which, as seen, must be placed in a closing position when the bag container 13 is inserted correctly inside the machine.

In order to do so, the lid 16 has a double-wall structure, with an outer cover 22 intended to form an upper wall of the bag container 13 when it is in a closed condition, and an inner bottom 23, spaced from the outer cover 22 and destined to face the inner space of the bag 14 when the lid 16 is closed.

Advantageously, the outer cover 22 is also provided with side walls 24 for peripheral closure of the interspace 25 present between the cover itself and the inner bottom 23 of the lid, so as to prevent any access attempt to said interspace from outside.

As well visible in FIGS. 4 and 5, the outer cover 22 and the inner bottom 23 of the lid 16 are provided with respective corresponding openings 26, 27 suitable to identify a passage 28 for the banknotes entering the bag 14, coming from the machine safe.

Inside the interspace 25 a movable element 29 is present, suitable to alternatively realize, on command, opening and closing of said passage 28.

Figure 8:
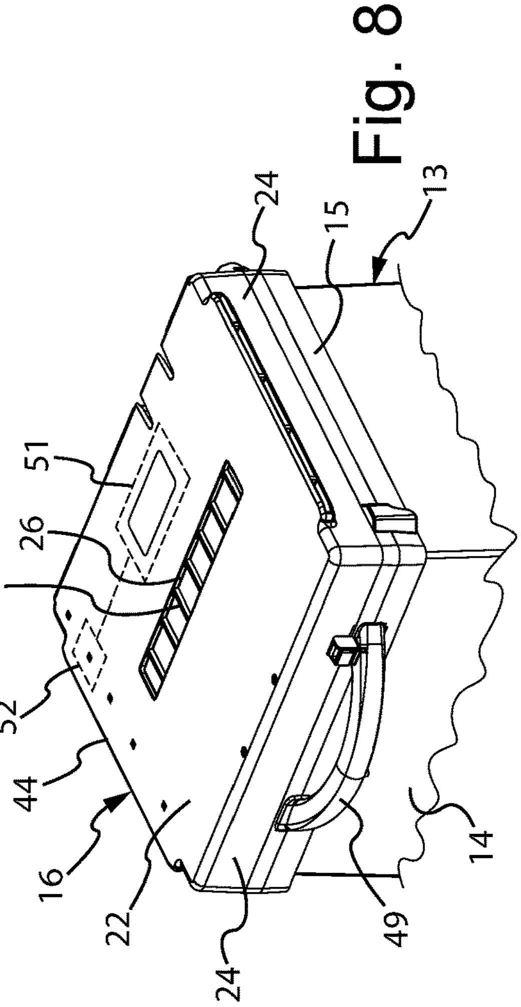
FIG. 8 shows, at the front, the upper portion of the bag container in the same configuration of FIG. 7.

In one preferred embodiment, said movable element 29 comprises a shutter sliding along a plane parallel to the outer cover 22 and to the inner bottom 23 of the lid 16, between an opening position (shown in the FIGS. 4 and 7) of the banknote passage 28 and a closing position thereof (shown in the FIGS. 5 and 8).

An appropriate actuator 51 (for example an electric motor and related kinematic mechanisms) advantageously housed inside the interspace 25 of the lid 16 is naturally provided for the controlled movement of the shutter 29. Said actuator is shown schematically in FIGS. 7 and 8, as it can be easily envisaged and realized by the skilled in the art depending on the shape and size of the movable parts and spaces available.

Advantageously always at the closing lid 16, there is also an electronic board 52 (also schematically shown in FIGS. 7 and 8), duly connected to the control unit 50 and to the actuator 51, for managing the opening and closing of the shutter 29.

As it can be seen for example in FIG. 6, the bag-holding frame 17 is in turn provided with an opening 30 with shape and size suitable to be located in correspondence of the openings 26, 27 (and, therefore, of the relevant passage 28) of the lid 16 when the bag container 13, with the lid in closed position, is correctly inserted inside the machine on the bag-holding frame 17.

As said, the bag container 13 can be inserted into the machine only if its lid 16 is closed correctly on the upper rigid mouth 15 supporting the bag 14.

The bag container 13 is further provided with security closing means of the lid 16 on the upper rigid mouth 15 supporting the bag 14.

In the herein illustrated embodiment, said security closing means of the lid 16 can be made by means of a security seal 43 (schematically represented in FIG. 5), for example a self-blocking tie, that can be inserted into a seat passing through the lid 16 and the upper rigid mouth 15 of the bag container 13.

Figure 10:
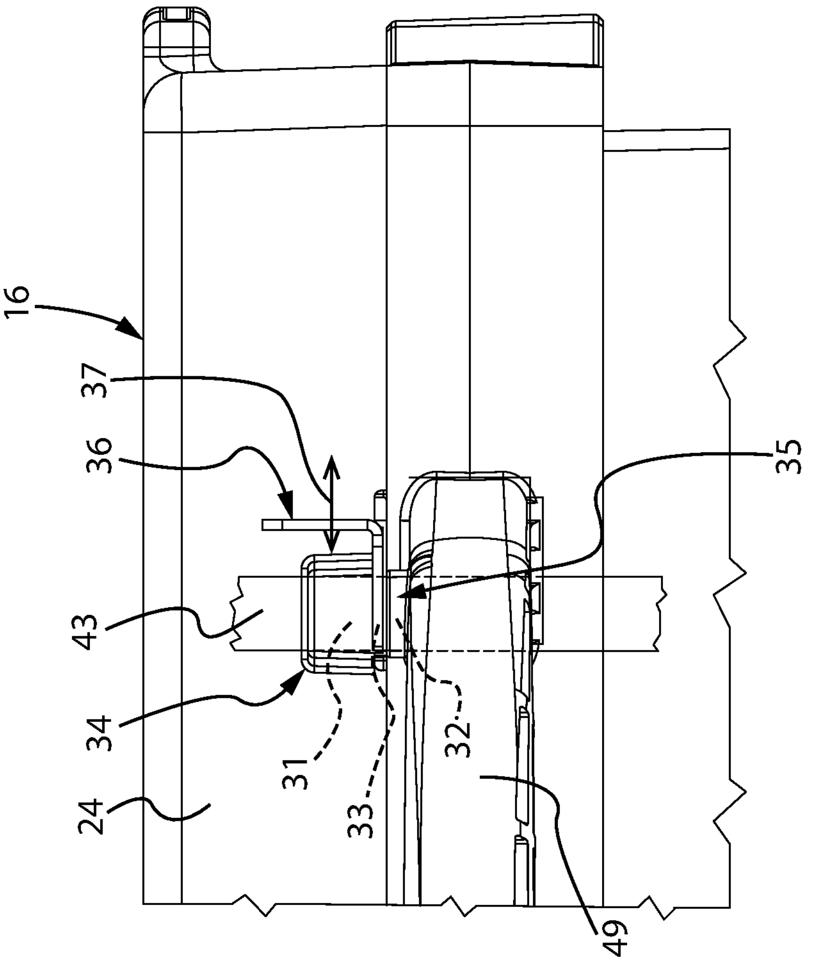
FIGS. 9 and 10 show a detail of the security closing means of the lid of the bag container.
Figure 9:
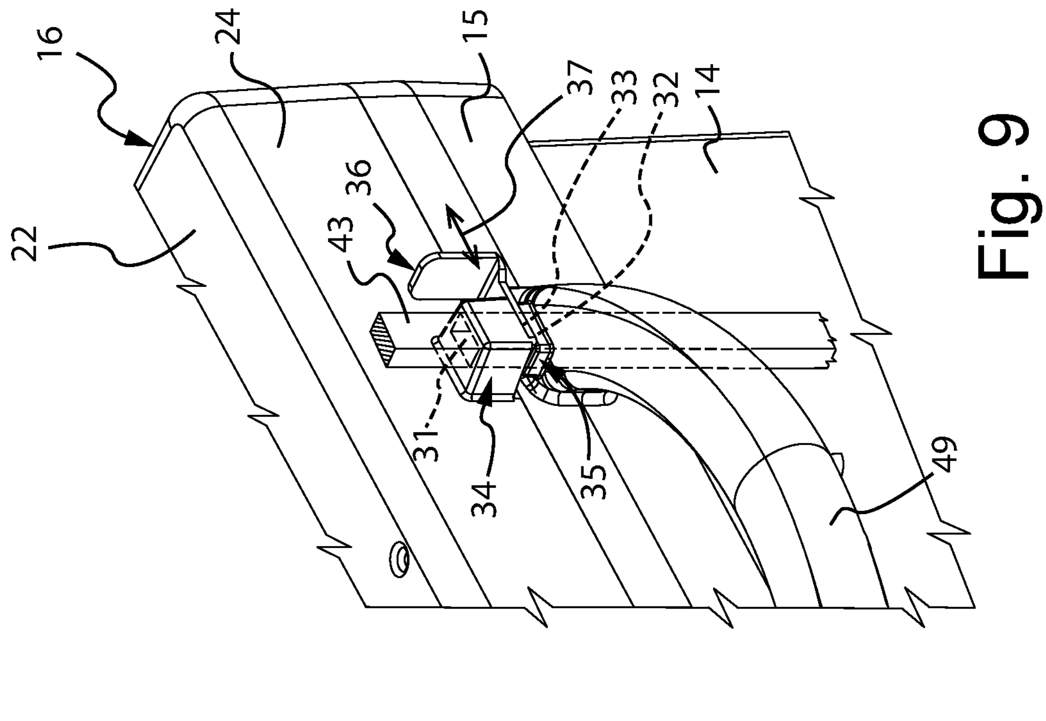

In particular, as visible in FIGS. 9 and 10, the seat for inserting the security seal 43 comprises three co-axial holes 31, 32, 33 respectively passing through a first portion 34 of the lid 16, through a second portion 35 of the upper rigid mouth 15 and through a movable hook 36 for locking and unlocking the lid, sliding transversely between said first and second portions 34, 35 as schematically illustrated by the arrow 37 in FIGS. 9 and 10.

Advantageously, said first and second portions 34, 35 are portions protruding forwardly respectively from the lid 16 and from the upper rigid mouth 15.

As it can be seen, the security seal 43 opposes transversally to the opening motion of the hook 36 and, consequently, it provides a high security against a forced opening of the bag container even when the seal has not been perfectly tightened.

A further degree of security against undue opening attempts of the bag container is provided by the "anti-unhooking" security system at the rear part of the container.

Figure 12:
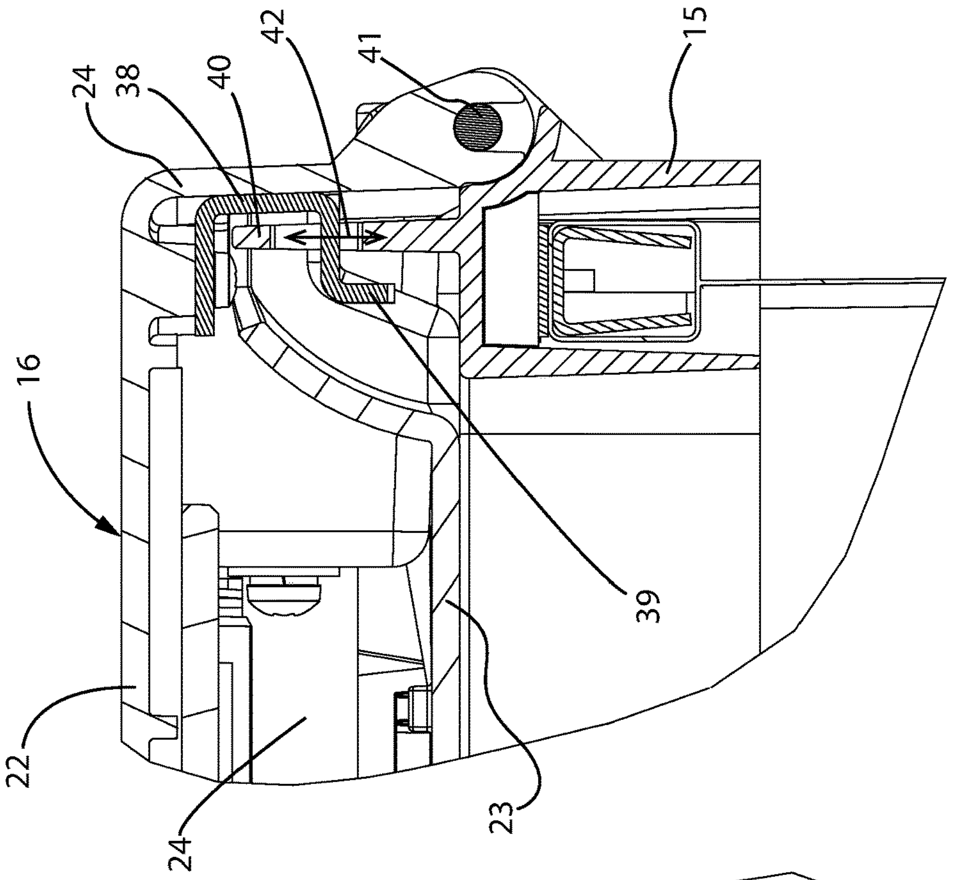
FIGS. 11 and 12 show a detail of the rear security means of the lid of the bag container.
Figure 11:
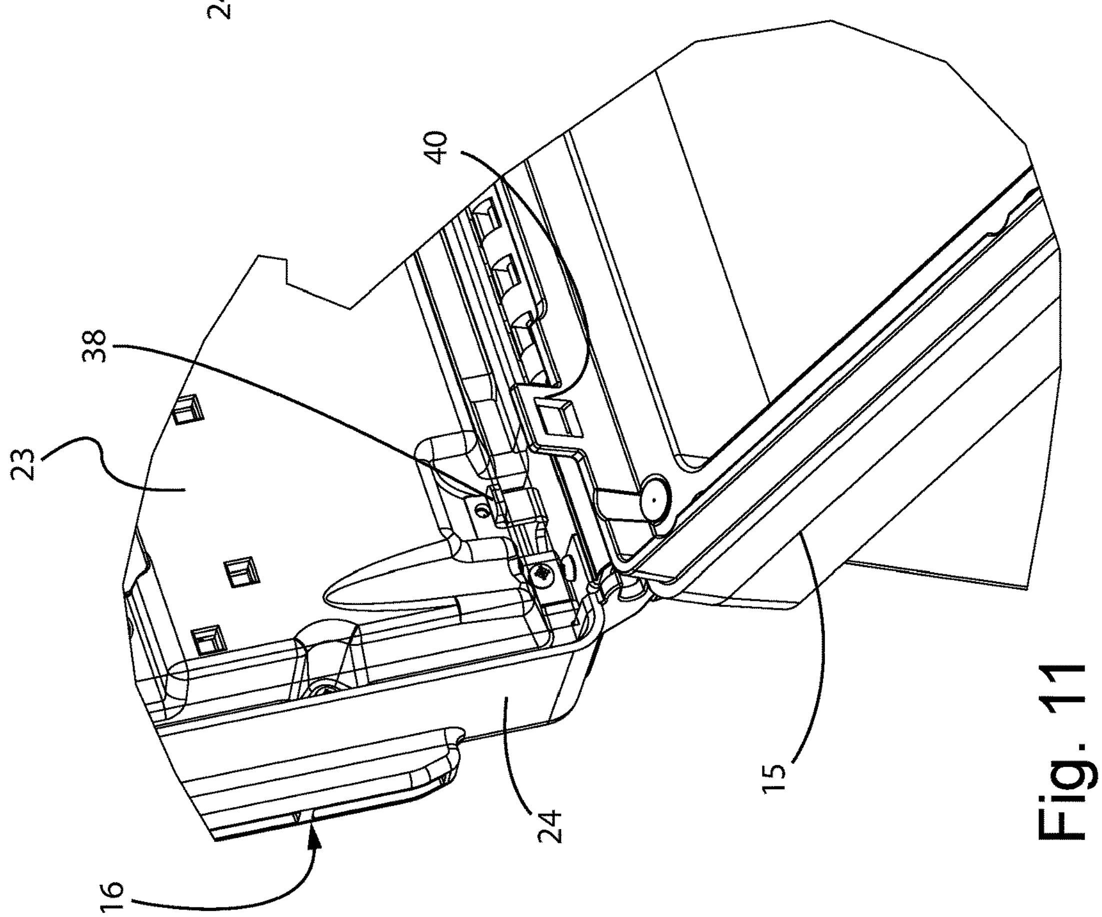

In particular, as visible in FIGS. 11 and 12, at the hinging rear edge of the lid 16 (advantageously, stably fixed to the rear peripheral wall 24 of the outer cover 22) hooks 38 are present having one end 39 folded and inserted into corresponding eyelets 40 arranged on the upper rigid mouth 15 of the bag container 13. As well visible in particular in FIG. 12, in case someone attempts to tamper with the bag container by removing the pin 41 that hinges the lid 16 to the upper rigid mouth 15 and by lifting the rear edge of the lid according to arrow 42 of FIG. 12, the removal of the lid would be hindered as the aforesaid hooks 38 remain constrained inside their respective eyelets 40.

The operations of inserting the bag container 13 into the safe 11 and removing the container from the safe, after being filled with the banknotes from the machine, will now be described.

Inserting the Bag Into the Safe

In order to insert the bag container 13 into the safe 11 it is firstly necessary to close the lid 16 on the upper rigid mouth 15 supporting the bag 14 and to apply the security seal 43 of the lid 16, inserting it through the seat 31, 32, 33 and blocking the opening hook 36. Thereby, the bag container 13 is completely closed, as the shutter 29, as we will see, can be opened only if the bag container 13 is correctly inserted and blocked in the bag-holding frame 17 of the machine.

After that, starting from the condition illustrated in FIG. 3, the bag container 13 can be introduced into the safe 11, inserting the side protrusions 44 of the lid 16 in the grooved guides 45 of the bag-holding frame 17 until engagement of the blocking element 19 in the electro-actuated lock 18 provided on the rear portion of the bag-holding frame 17. The bag container 13 is now in the condition illustrated in FIG. 1.

The presence and the correct blocking of the bag container 13 on the bag-holding frame 17 are signalled to the control unit 50 by the micro-switch associated to the electro-actuated lock 18, which sends to the control unit a signal of presence and correct blocking of the bag container 13 on the bag-holding frame 17 ("bag inserted" signal) through the electric connection between the connector 20 arranged on the bag-holding frame 17 and the electric connector 21 provided on the bag container 13.

Communications between the control unit 50 and the bag container 13 (and, in particular, the electronic board 52 on the lid 16) are advantageously made according to encrypted protocols, as the person skilled in the art can easily imagine.

The control unit 50, once received the "bag inserted" signal, is set to allow the controlled opening and closing of the shutter 29, by means of the relevant actuator 51, to enable inserting of the banknotes into the bag.

Depending on the desired modes of managing the machine, opening and closing the shutter 29 can be carried out every time one or more banknotes must be inserted into the bag, or one can choose to open the shutter 29 once the bag container 13 is inserted into the machine, always keeping it opened and closing it only before removing the container itself from the machine.

Removing the Bag From the Safe

Before removing the bag container 13 from the safe 11, the control unit 50 verifies that the shutter 29 is in the closed position and, if such condition is verified ("shutter closed" signal), the control unit 50 can send, via electric connection between the connector 20 provided on the bag-holding frame 17 and the electric connector 21 provided on the bag container 13, an opening control to the electro-actuated lock 18, disengaging the lock element 19 and releasing the bag container 13, which can now be extracted from the safe 11 and transferred, by an operator in charge of transporting valuables, to a place for banknote storage or re-use.

Once the container is taken to a safe place, the security seal 43 can be removed so that the lid 16 can be completely opened to extract more easily the banknotes contained in the bag.

It is now clear that the preset objects are reached by the system for the safe coupling of a re-usable bag to a banknote handling and storing machine according to the disclosure.

In fact, the blocking of the bag container to the bag-holding frame occurs thanks to the electro-actuated lock 18, which does not allow the control unit 50 to enable opening the shutter 29 (and thus to fill the bag) until the "bag inserted" signal has been sent and does not unlock the bag (for removing it from the machine) until it receives the "shutter closed" signal from the control unit.

Clearly, the above description of an embodiment applying the innovative principles of the present disclosure is given by way of an illustrative example of such innovative principles and must not, therefore, be taken to limit the scope of the patent claimed herein.

For example, the movable element 29 suitable for alternatively opening and closing the banknote passage 28 may be made in the form of a door rotating inside the interspace 25, instead of a sliding shutter.

Furthermore, the micro-switch associated to the electro-actuated lock 18 for detecting the presence and correct insertion and locking of the bag container 13 into the bag-holding frame 17 may be placed in a physically different position with respect to said electro-actuated lock 18, while being electrically connected thereto.

As it can be observed from the enclosed drawings, it is generally advantageous (for ease of construction and to minimize the size of the bag-holding frame 17) to make the guide protrusions 44 of the bag container 13 at the outer cover 22 of the lid 16, i.e. at the upper end of the container.

In that case, the bag container 13 would be constrained to the bag-holding frame 17 (and thus to the safe 11) only by the lid 16 and therefore only the sliding hook 36 and the security seal 43 would be in charge of keeping the lid 16 closed relative to the upper rigid mouth 15 of the bag 14.

In order to guarantee a higher degree of security, preventing the opening of the bag container (even in case the seal 43 was removed) while the container is blocked in the safe, the bag-holding frame can be provided (advantageously at the front ends of the grooved guides 45 thereof) with hook elements 46 having ends 47 suitable to be inserted into corresponding seats 48 in the rigid mouth 15 of the bag, as illustrated in greater detail in FIGS. 6 and 7.

Thereby, both the lid 16 and the upper rigid mouth 15 remain constrained to the bag-holding frame 17 when the bag container 13 is correctly inserted and blocked inside the machine.

Finally, the bag container 13 can also advantageously comprise one or more handles 49 for easily transporting the bag once removed from the machine.

The invention claimed is:

1. A system for the safe coupling of a re-usable bag to a banknote handling and storing machine, the system comprising:

a bag container, comprised of an upper rigid mouth, of a flexible bag permanently fixed to said rigid mouth and of a lid for closing said rigid mouth; and a bag-holding frame, suitable for being stably fixed to a safe structure of the machine, for supporting and hooking the bag container when placed inside the machine to be filled in with the banknotes;

wherein the system further comprises coupling and hooking electromechanical means disposed between the bag container and the bag-holding frame, said coupling and hooking electromechanical means comprising an electro-actuated lock provided on the bag-holding frame and a blocking element provided on the bag container in correspondence of said electro-actuated lock to engage and block into said electro-actuated lock when the bag container is correctly coupled to the bag-holding frame, with a micro-switch associated with said electro-actuated lock to detect the presence and the correct insertion and blocking of the bag container in the bag-holding frame and to send to a control unit a signal of presence and correct blocking of the bag container on the bag-holding frame, said coupling and hooking electromechanical means further comprising a first electric connector provided on the bag-holding frame and a second electric connector provided on the bag container in correspondence of said first electric connector to realize the electrical connection between the bag container, the bag-holding frame and the control unit when the bag container is positioned on the bag-holding frame, and further wherein the lid for closing said rigid mouth is provided with a movable means, movable on command between an opening position and a closing position, suitable to allow, on command, the banknotes passing from the machine to the bag through the closed lid when the bag container is correctly inserted inside the machine.

2. The system for the safe coupling of a re-usable bag to a banknote handling and storing machine according to claim 1, wherein the lid has a double wall, with an outer cover intended to form the upper wall of the bag container when the lid closes the rigid mouth and an inner bottom, spaced from said outer cover and destined to face the inner space of the bag when the lid closes the rigid mouth, with an interspace being present between the outer cover and the inner bottom.

3. The system for the safe coupling of a re-usable bag to a banknote handling and storing machine according to claim 2, wherein the outer cover) and the inner bottom of the lid are provided with respective corresponding openings configured to individuate a passage for the banknotes entering the bag.

4. The system for the safe coupling of a re-usable bag to a banknote handling and storing machine according to claim 3, wherein said movable means adapted to allow the banknotes passing from the machine to the bag through the closed lid are comprised of a movable element, arranged inside the interspace in the lid, configured to alternatively realize, on command, opening and closing of said passage.

5. The system for the safe coupling of a re-usable bag to a banknote handling and storing machine according to claim 4, wherein the movable element is constituted by a shutter sliding along a plane parallel to the outer cover and to the inner bottom of the lid, between an opening position of the banknote passage and a closing position of said passage.

6. The system for the safe coupling of a re-usable bag to a banknote handling and storing machine according to claim 4, wherein, inside the interspace of the lid), an actuator for the controlled movement of the movable element is provided.

7. The system for the safe coupling of a re-usable bag to a banknote handling and storing machine according to claim 6, further comprising an electronic board, connected to the control unit and to the actuator, for managing the opening and closing of the movable element.

8. The system for the safe coupling of a re-usable bag to a banknote handling and storing machine according to claim 4, wherein the outer cover is also provided with side walls of peripheral closure of said interspace.

9. The system for the safe coupling of a re-usable bag to a banknote handling and storing machine according to claim 3, wherein the bag-holding frame is provided in turn-with an opening intended to be located in correspondence of the openings of the lid, and therefore of the passage identified by the openings, when the bag container is correctly inserted inside the machine on the bag-holding frame, with the lid closing the rigid mouth.

10. The system for the safe coupling of a re-usable bag to a banknote handling and storing machine according to claim 1, wherein the lid is hinged to the upper rigid mouth of the bag container to be rotatable between a closed position and an open position of complete access to the inside of the bag.

11. The system for the safe coupling of a re-usable bag to a banknote handling and storing machine according to claim 10, wherein the bag container is equipped, in correspondence of the hinging rear edge of the lid to the upper rigid mouth, with hooks integral with the lid, having one end folded and inserted into corresponding eyelets arranged on the upper rigid mouth, thereby hindering a lifting of said rear edge of the lid relative to the rigid mouth even in the event of tampering of the hinging.

12. The system for the safe coupling of a re-usable bag to a banknote handling and storing machine according to claim 1, wherein said electro-actuated lock is arranged on a rear portion of the bag-holding frame, facing toward the front part thereof, and in that the blocking element of the bag container is arranged on a rear portion of said bag container, projecting rearwardly therefrom.

13. The system for the safe coupling of a re-usable bag to a banknote handling and storing machine according to claim 12, wherein the blocking element and the second electric connector are arranged on a rear portion of the lid, above a hinging axis of the lid to the upper rigid mouth.

14. The system for the safe coupling of a re-usable bag to a banknote handling and storing machine according to claim 1, wherein the first electric connector is arranged on a rear portion of the bag-holding frame, facing toward the front part thereof, and in that the second electric connector is arranged on a rear portion of the bag container.

15. The system for the safe coupling of a re-usable bag to a banknote handling and storing machine according to claim 1, wherein the bag container is provided with security closing means of the lid on the upper rigid mouth, comprising a security seal configured to be inserted in a seat passing through the lid and the upper rigid mouth.

16. The system for the safe coupling of a re-usable bag to a banknote handling and storing machine according to claim 15, wherein the seat for inserting the security seal comprises three coaxial holes respectively passing through a first portion forwardly projecting from the lid, through a second portion forwardly protruding from the upper rigid mouth and through a movable hook for locking and unlocking the lid, sliding transversely between said first and second portions.

17. The system for the safe coupling of a re-usable bag to a banknote handling and storing machine according to claim 1, wherein the bag-holding frame is provided with hook elements having ends suitable to be inserted in corresponding seats on the upper rigid mouth when the bag container is correctly coupled to the bag-holding frame.

18. A method for coupling and removal of a bag container from a banknote handling and storing machine according to the coupling-system of claim 1, comprising, for the insertion of the bag container into the machine, the method including the following steps:

closing the lid on the upper rigid mouth supporting the bag, applying a security seal for the lid, inserting the security seal into a seat passing through a first portion belonging to the lid, through a second portion belonging to the upper rigid mouth and through a movable hook for locking and unlocking the lid, sliding transversely between said first and second portions, introducing the bag container inside the machine, inserting the bag container in guides of the bag-holding frame until engagement of the blocking element in the electro-actuated lock provided on the bag-holding frame, thus realizing an electrical connection between the electric connectors respectively provided on the bag-holding frame and on the bag container and sending to the control unit a signal of presence and correct blocking of the bag container on the bag-holding frame, following receipt of said signal of presence and correct blocking of the bag container on the bag-holding frame, the control unit enabling the controlled opening and closing of the movable element provided in correspondence of the passage for the banknotes from the machine to the bag, and for removing the bag container from the machine including the following steps:

verifying, by the control unit, that said movable element is in the closed position and, if this condition is verified, sending an opening control from the control unit to the electro-actuated lock, for the disengagement of the blocking element and the release of the bag container from the bag-holding frame, and extracting the bag container from the machine.

19. The method for coupling and removal of a bag container from a banknote handling and storing machine according to claim 18, wherein, after the extraction of the bag container from the machine and its transfer to destination, the security seal is removed from the seat and the lid is brought into the opening position for complete access to the bag.

20. The method for coupling and removal of a bag container from a banknote handling and storing machine according to claim 18, wherein the opening and closing of the movable element are carried out every time one or more banknotes must be inserted into the bag.

21. The method for coupling and removal of a bag container from a banknote handling and storing machine according to claim 18, wherein the movable element is opened once the bag container has been inserted into the machine, kept open while the bag container is inside the machine and is closed before removing the container from the machine.

* * * * *